(12) United States Patent  
Girardot et al.

(10) Patent No.: US 9,388,904 B2  
(45) Date of Patent: Jul. 12, 2016

(54) GASKET, IN PARTICULAR FOR A PRESSURISED LIQUID

(71) Applicant: CARL FREUDENBERG KG, Weinheim (DE)

(72) Inventors: Thierry Girardot, Saint Geosmes (FR); Dominique Lutaud, Orbigny au Mont (FR); Arnaud Soudet, Longeau (FR)

(73) Assignee: CARL FREUDENBERG KG, Weinheim (DE)

( * ) Notice: Subject to any disclaimer, the term of this patent is extended or adjusted under 35 U.S.C. 154(b) by 0 days.

(21) Appl. No.: 14/428,185

(22) PCT Filed: Sep. 16, 2013

(86) PCT No.: PCT/IB2013/002014  
§ 371 (c)(1),  
(2) Date: Mar. 13, 2015

(87) PCT Pub. No.: WO2014/041420  
PCT Pub. Date: Mar. 20, 2014

(65) Prior Publication Data  
US 2015/0226332 A1 Aug. 13, 2015

(30) Foreign Application Priority Data  
Sep. 14, 2012 (FR) ..................... 12 58667

(51) Int. Cl.  
*F16J 15/32* (2016.01)  
*F16J 15/00* (2006.01)

(52) U.S. Cl.  
CPC ............ *F16J 15/3268* (2013.01); *F16J 15/002* (2013.01); *F16J 15/3228* (2013.01); *F16J 15/3252* (2013.01); *F16J 15/3276* (2013.01)

(58) Field of Classification Search  
CPC ..... F16J 15/32; F16J 15/3204; F16J 15/3216; F16J 15/322; F16J 15/3224; F16J 15/324; F16J 15/3244; F16J 15/3248; F16J 15/3252; F16J 15/3268  
See application file for complete search history.

(56) References Cited

U.S. PATENT DOCUMENTS

| 5,056,799 A | 10/1991 | Takenaka et al. |
| 2002/0117810 A1 | 8/2002 | Schemm |
| 2003/0031828 A1 | 2/2003 | Kosty et al. |

(Continued)

FOREIGN PATENT DOCUMENTS

| DE | 10 2006 059398 A1 | 6/2008 |
| GB | 2 173 264 A | 10/1986 |
| WO | 2008/009317 A1 | 1/2008 |

OTHER PUBLICATIONS

International Search Report, dated Mar. 20, 2013, from corresponding PCT application.

*Primary Examiner* — Gilbert Lee  
(74) *Attorney, Agent, or Firm* — Young & Thompson

(57) ABSTRACT

A gasket, in particular for a pressurized liquid, includes: a support ring (2) having an axial flange (3) and a radial flange (4); and a PTFE washer (5) arranged on the ring (2), the washer at least partially covering the outer face (3') of the axial flange (3) and forming a flexible inner sealing lip (6) intended to be applied against an element to be sealed, such as a shaft. The sealing lip (6) includes an annular portion bearing mostly on the element to be sealed and a curved annular connecting portion. The sealing lip (6) has a small thickness (EL), typically less than 0.8 mm, and, in the absence of stress, substantially forms a frustoconical ring or sleeve having a vertex angle of between 40° and 80°.

20 Claims, 5 Drawing Sheets

(56) References Cited

U.S. PATENT DOCUMENTS

| | | | | |
|---|---|---|---|---|
| 2010/0244390 A1* | 9/2010 | Berdichevsky | ........ | F16J 15/322 277/568 |
| 2013/0200575 A1* | 8/2013 | Humblot | .............. | F16J 15/3204 277/549 |
| 2013/0264776 A1* | 10/2013 | Kurth | ....................... | F16J 15/32 277/549 |
| 2013/0320629 A1* | 12/2013 | Benedix | ............... | F16J 15/3252 277/549 |
| 2014/0110904 A1* | 4/2014 | Berdichevsky | ...... | F16J 15/3244 277/559 |
| 2014/0312571 A1* | 10/2014 | Kurth | ................... | F16J 15/3244 277/559 |
| 2015/0260291 A1* | 9/2015 | Lutaud | ................. | F04D 29/043 415/109 |

* cited by examiner

GASKET, IN PARTICULAR FOR A PRESSURISED LIQUID

BACKGROUND OF THE INVENTION

1. Field of the Invention

This invention relates to the field of sealing joints, in particular those that ensure sealing at the level of and around a movable element, such as a shaft, an axle or the like, driven by a rotational movement and extending in or through a passage, a housing, an opening or the like of a stationary body, element, casing or the like.

2. Description of the Related Art

More particularly, the invention relates to a sealing joint comprising, on the one hand, a support ring or frame (generally made of steel plate) with an external axial flange and an internal radial flange, and, on the other hand, a washer made of a TEFLON®-based sealing material, which is mounted or arranged on said ring, by at least partially covering the external surface of the axial flange and extending beyond the inner end of the radial flange in such a way as to form a flexible sealing lip. This lip is designed to be applied circumferentially against or on an element that is to be sealed, in particular a rotational cylindrical element such as a shaft or the like, with said sealing lip then having a first annular portion that for the most part rests on the element that is to be sealed and a second annular curved connecting portion (connecting the first end portion of the lip to the part of the washer made integral with the radial flange of the ring).

Such a joint is known in particular by the documents WO 2008/009317 and US 2003/0031828 (FIG. 5a).

These joints ensure, with the same washer, a double-seal, namely both an internal dynamic seal relative to the movable element (by means of the flexible sealing lip that is not supported by the ring) and an external static seal relative to the wall of the housing or the mounting opening, through which the element that is to be sealed generally passes (by means of the washer part present on the external surface of the axial flange).

However, the sealing joints disclosed by these two documents have at least the following two drawbacks:

1) A lifting of the free end of the sealing lip whose effect is negative in terms of maintaining tightness and sealing behavior is noted, in particular when this lip rests on the element that is to be sealed over a great length (significant axial distance);

2) These joints are not suitable for withstanding pressure (problem of sealing behavior at the level of the element that is to be sealed when the medium that is to be isolated contains pressurized liquid, typically between approximately 1 and 10 bar), because of a low resistance to deformation, and even a possible turning of the sealing lip when the latter is subjected to pressure (for example, in applications such as sealing pump shafts).

To attempt to remedy these two drawbacks, the document US 2002/0117810 proposes a sealing joint whose sealing lip has a significant thickness and is subdivided radially into a primary sealing lip, coming to rest on the element that is to be sealed, and a secondary elastic support lip.

This secondary lip comes (in the absence of significant pressure) into contact with the free end (tip) by exerting a support force stressing this end against the element that is to be sealed and thus combating its separation and its lifting.

In addition, when the medium that is to be isolated is subjected to pressure, the primary and secondary lips are superposed tightly and together form a single lip of great thickness that can withstand pressure without turning.

However, although providing satisfaction when the lip/element contact area has a short distance, this solution is complex structurally and its achievement is difficult (requiring a precise cutaway of the lip, double-machining of the primary and secondary lips).

In addition, the material cost is high, taking into account the large thickness of the bottom lip, and the friction forces between the lip and the movable element are increased.

Finally, in the document US 2002/0117810, the external static seal (between joint and housing) is obtained by using a second sealing material.

BRIEF SUMMARY OF THE INVENTION

This invention has as its object to remedy at least the above-mentioned major drawbacks by proposing a simple solution, easy to implement and economical.

For this purpose, the invention proposes a sealing joint of the above-mentioned type, improved and in particular suitable for withstanding pressure, whereby this joint is characterized in that the sealing lip has a small thickness, typically less than 0.8 mm, and forms, in the absence of stress, essentially a sleeve or tapered ring with a peak angle of $90°-\alpha$, with a being between 10° and 50°.

BRIEF DESCRIPTION OF THE DRAWINGS

The invention will be better understood using the description below, which relates to preferred embodiments, provided by way of nonlimiting examples and explained with reference to the accompanying diagrammatic drawings, in which.

DETAILED DESCRIPTION OF THE PREFERRED EMBODIMENTS

Figure 1:
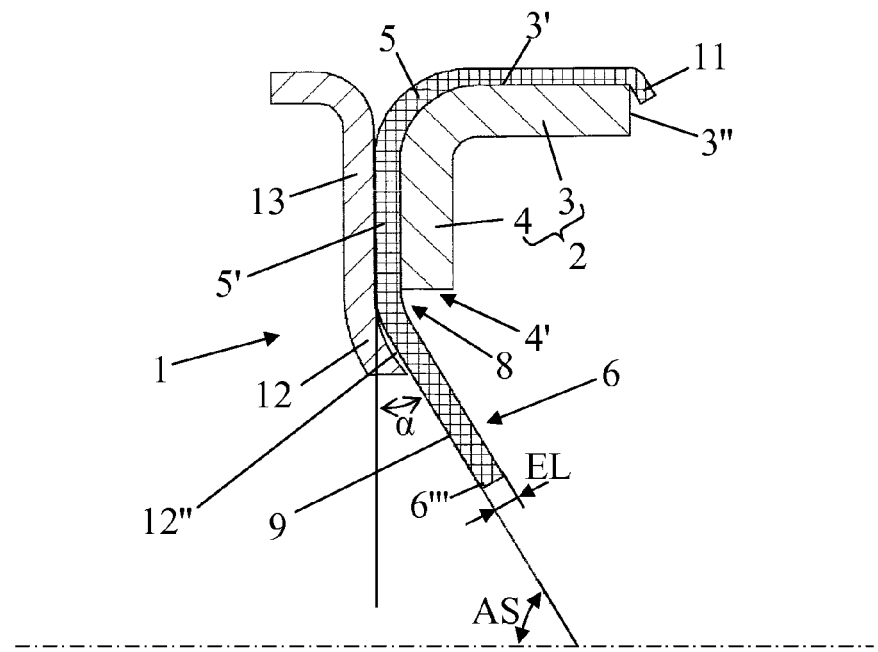
FIG. 1 is a cutaway view of a sealing joint according to a first embodiment, in the absence of any stress.

FIGS. 1, 2 and 4 to 8 show a sealing joint 1, in particular for pressurized liquid. This joint 1 comprises, on the one hand, a support ring or frame 2 with an external axial flange 3 and an internal radial flange 4, and, on the other hand, a washer 5 made of a TEFLON®-based sealing material, which is mounted or arranged on said ring 2, by at least partially covering the external surface 3' of the axial flange 3 and by extending beyond the inner end 4' of the radial flange 4 in such a way as to form a flexible sealing lip 6. The latter is designed to be applied circumferentially against or on an element 7 that is to be sealed, in particular a rotational cylindrical element such as a shaft or the like, with said sealing lip 6 then having a first annular portion 6' that for the most part rests on the element that is to be sealed and a second annular curved connecting portion 6".

Figure 9:
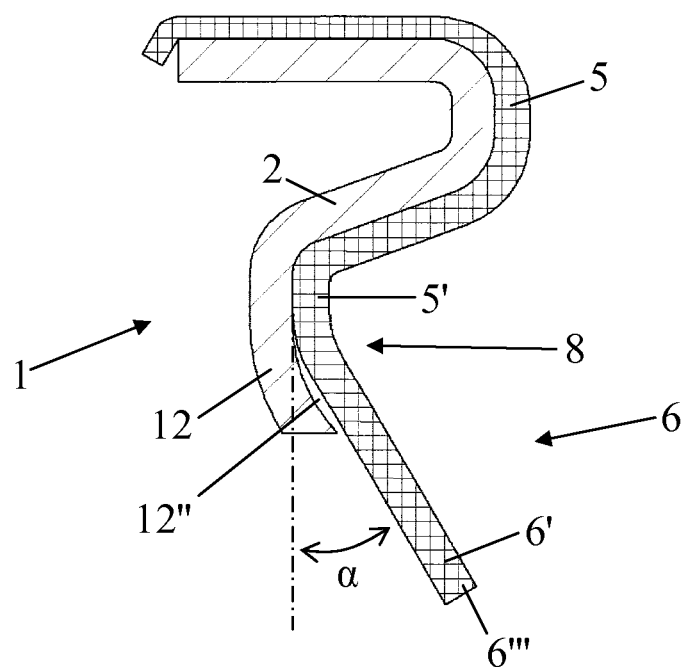
FIG. 9 is a partial cutaway view of the joint of FIG. 8, in the absence of stress (before mounting).

In accordance with the invention and as FIG. 1 shows more specifically, the sealing lip 6 has a small thickness EL, typically less than 0.8 mm, and forms, in the absence of stress, essentially a sleeve or tapered ring with a peak angle of 90°−α, with a being between 10° and 50° (FIGS. 1 and 9).

In other words, and as FIG. 1 shows, the peak angle AS=90°−α is between 40° and 80° (with α being the angle relative to the plane perpendicular to the central axis of symmetry of the joint 1).

The inventors noted that in an unexpected and surprising way, a sealing joint 1 of the type indicated above, whose lip 5 had the two above-mentioned technical arrangements, did not experience the phenomenon of lifting of the end of the lip 6, even when the contact area 9 has a significant axial dimension.

In addition, the specific initial inclination (inherent to the washer 4) of the sealing lip 6, before its being applied against the element 7 that is to be sealed, relative to the central axis of symmetry of the joint 1 (generally combined with the axis X of rotation/symmetry of the element 7), on the one hand, and relative to the part 5' of the washer 5 tightly applied on the inner end 4' of the radial flange 4 (angle α), on the other hand, simultaneously ends in a preconditioning of the lip 6 increasing its resistance to a turning in the case of pressure application from the side toward which the lip 6 is originally inclined.

Of course, the connection between the lip 6 and the part 5' of the washer 5 does not have a clean folding line, but rather a curved transition area 8.

More specifically, and according to an advantageous arrangement of the invention, the sealing lip 6, preferably in the form of a tapered sleeve with an essentially flat wall in the absence of stress, is connected to the part 5' of the washer 5 that rests on and/or is made integral with the radial flange 4, by a precurved or inflected annular region 8 of the washer 5, advantageously located immediately after the inner end 4' of said radial flange 4, oriented in the direction of the medium MLS that is to be sealed and being part of the annular connecting portion 6".

The region 8 is thus formed in the washer 5 (in the form of permanent local deformation of the wall of the latter) during the production of the sealing joint 1 (preferably by deformation during the engagement of the washer 5 with the ring 2) and constitutes a start of the curving of the connecting portion 6" during the mounting of the joint 1 on the element 7.

Consistent with a preferred practical embodiment of the invention, making it possible according to the inventors to respond in an optimized manner to the above-mentioned drawbacks, while limiting the costs and avoiding complicating the design and the process of production of the joint 1 (in particular relative to the production process described in the above-mentioned document WO 2008/009317), it is advantageously provided that the thickness of the sealing lip 6 is between 0.4 and 0.7 mm, preferably between 0.45 and 0.65 mm, and that the angle α is between 15° and 45°, preferably between 20° and 40°. In addition, the precurved region 8 is advantageously shaped by local deformation of the wall of the washer 5, before or after mounting on the carrying ring 2.

So as to ensure a seal of sufficient quality for meeting final application requirements, in particular under pressure, the relative dimensions and arrangements of the support ring 2, of the washer 5 that is made of a TEFLON®-based material, and the element 7 that is to be sealed can be determined for defining an area 9 for tight contact and support of the portion 6' of the sealing lip 6 on said element 7 with an axial distance P (in the direction X) of between 1.5 and 5.0 mm, preferably between 2.5 and 3.5 mm, from the free edge 6''' of said lip 6.

Despite this significant distance, the inventors noted that the respect for the above-mentioned geometric arrangements could make it possible to prevent the phenomenon of lifting of the end 6" and to provide an increased resistance to turning (folding of the lip 6 and passage under the radial flange 4).

The portion 6' of the lip 6 can comprise a smooth support surface (contact area 9) and generally has a thickness that is essentially constant (although a variation of the thickness based on conditions of use can be considered).

Nevertheless, according to an additional characteristic of the invention, not shown in detail in the accompanying figures (only diagrammatically in FIG. 2), the sealing lip 6 can comprise, at the level of the contact surface of the portion 6' of this lip 6 designed to come to rest on the element 7 that is to be sealed, a delivery structure 10 that is helical or in the form of threading, advantageously in the form of a groove with opposite sides of inclinations or different slopes, preferably with a cross-section or profile that is asymmetrically triangular in shape.

Such a structure 10 can, for example, be of the type of the one that is described in the PCT patent application No. PCT/FR2012/050239 and in the French patent application No. 12 51011 of Feb. 3, 2012, in the name of the applicant.

In addition, as shown in FIGS. 1 to 4 and 6 to 8, it can also be provided that the sealing washer 5 extends beyond the free edge 3" of the axial flange 3 and forms a projecting part 11, inclined or curved toward the interior and covering at least the outside ridge of said free edge 11.

The projecting part 11 thus forms a bevel connected to the frontal ridge for the introduction of the joint 1 into its housing 14, facilitating its centering and preventing any separation of the washer 5 relative to the axial flange 3 during the tightened or adjusted mounting of the joint 1.

So as to ensure preservation of the dynamic seal in the event of high pressure, to prevent damage to the sealing lip 6 in the case of pressure peaks (in particular repeated), and to rule out any turning of said lip 6, the joint 1 can also comprise or include a specific annular structure 12 for support and reinforcement for the sealing lip 6 located on the side opposite to the medium MLS that is to be sealed and extending at the level of the curved annular portion 6" of said lip 6 by partially assuming the shape of this portion 6" and by being separated from the latter.

Figure 3:
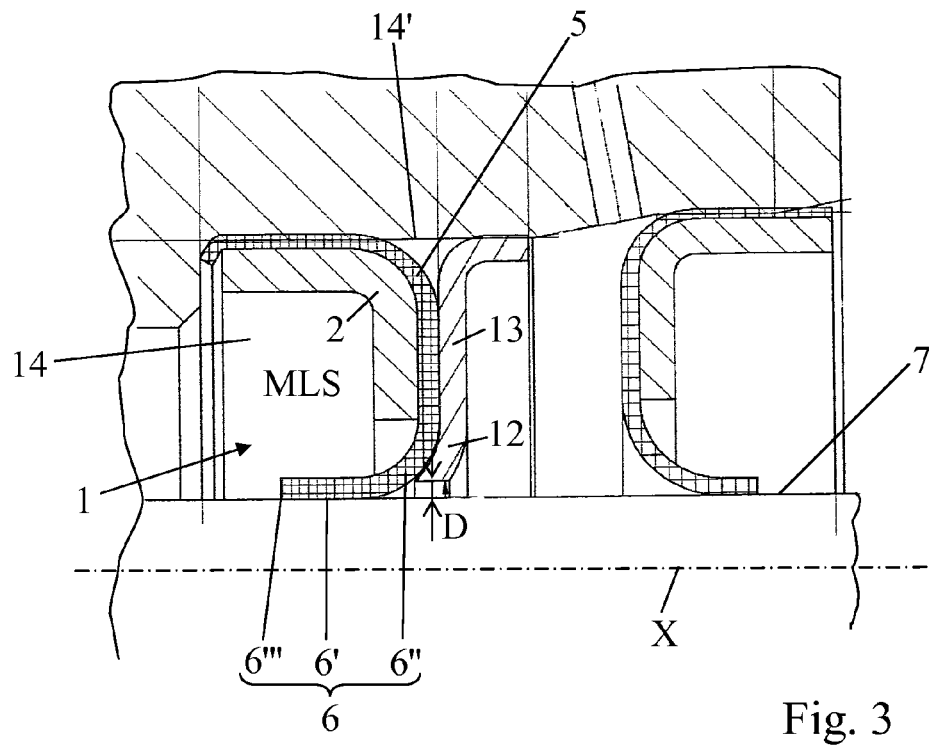
FIG. 3 is a partial cutaway view of a sealing system of a fuel pump comprising a sealing joint as shown in FIGS. 1 and 2.

As emerges from the accompanying FIGS, the lip 6 is not made integral with this structure 12, nor rests against it in the absence of sufficient pressure on said lip 6 (presence of a wedge-shaped gap 12" between 12 and 6 except in FIG. 3 because of the presence of sufficient pressure). This absence of engagement makes it possible to ensure that the lip 6 has great flexibility and an appropriate ability to adapt to possible radial movements or dissymmetry of the mobile element 7 that is to be sealed.

Figure 2:
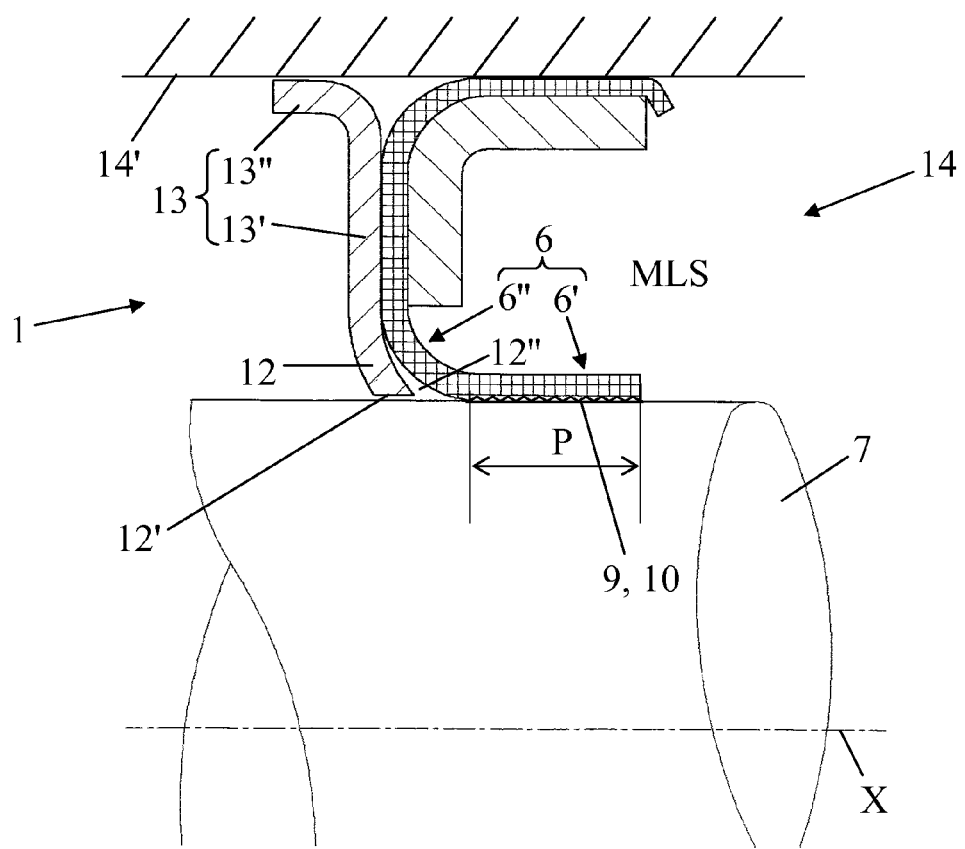
FIG. 2 is a cutaway view similar to the sealing joint of FIG. 1 after its mounting in a housing and around the element that is to be sealed (shaft)

It is further noted, by comparing, for example, FIGS. 1 and 2, that the size of this gap 12" increases when the lip 6 comes to rest on the element 7, this because of the forced bending of the portion 6" resulting in a more accentuated curving and therefore in a more significant separation between 6" and 12 (in the absence of pressure on the lip 6 by the medium that is to be sealed).

The result is a good adaptability of the lip 6 (to the relative movements between ring 2 and element 7) despite the presence of the rigid structure 12.

Consistent with an advantageous embodiment of the invention, the annular structure 12 for support and reinforcement consists of a curved circumferential flange, with the curving radius of said flange 12 being greater than the curving radius, in the absence of pressure, of the annular connecting portion 6" of the sealing lip 6 after installation of the sealing joint 1 around the element 7 that is to be sealed, preferably greater than the curving radius of the precurved annular region 8 of the washer 5, in the absence of stress on the sealing lip 6.

Preferably, the annular structure 12 for support and reinforcement, in the form of a circumferential flange, extends up to a short distance D from the element 7 that is to be sealed, with the free edge 12' of the flange 12 being located at a distance from said element 7 that is less than the thickness EL of the sealing lip 6, preferably less than at least half of said thickness EL, and even on the order of one-quarter or one-third of this thickness (function also of the uniformity of the surface and the movement of the element 7).

The flange 12 can then also act as a dust-barrier screen, etc., in combination with the component 2 or 13 of which it is part.

In accordance with a first embodiment of the invention, of which different variants are illustrated in FIGS. 1 to 5 of the drawings, the structure 12 for support and reinforcement is part of a second ring 13 that comprises at least one radial flange 13' extended from the inner side by a curved annular flange portion 12 forming said structure.

The second ring 13 can be assembled in different ways (mechanically, adhesively, materially, or by a combination of several engagement methods) with the ring 2 and/or the washer 5, and then forms with the latter a composite sealing joint 1 with three constituent components.

The second ring 13 preferably also comprises an axial flange 13" for its mounting with retention in the housing 14 simultaneously with the ring 2 (the rings 13 and 2 are preferably produced from the same material).

Although not shown, a sealing material can optionally be installed on this flange 13" (on its surface in contact with the housing 14).

In an advantageous manner, at least the part 5' of the washer 5 arranged on the radial flange 4 of the support ring 2 is sandwiched between the latter and the radial flange 13' of the second ring 13, optionally ensuring mechanical clamping of said washer part 5'.

Figure 4:
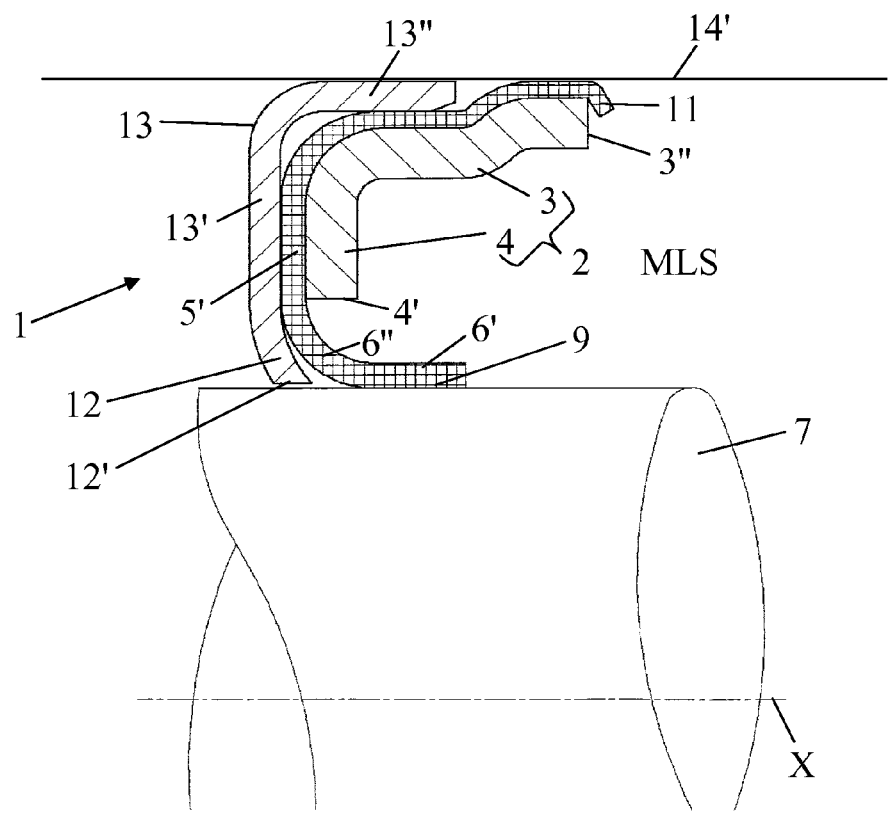
FIGS. 4 and 5 are partial cutaway views of a sealing joint in the mounted state, according to two other design variants of the first embodiment of the invention.
Figure 5:
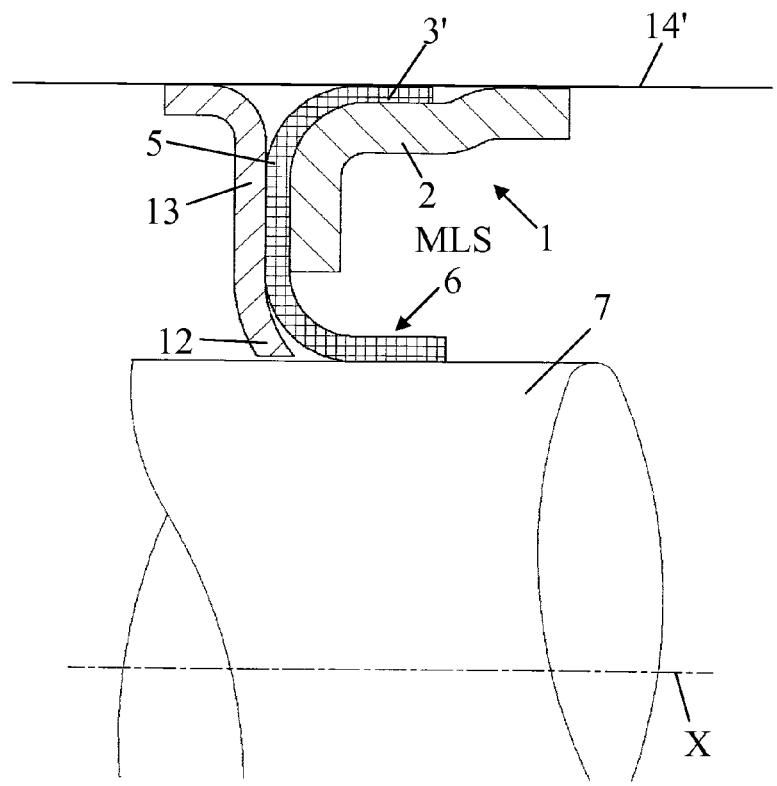

The second ring 13 can even interlock elastically tightened on the support ring 2 with sandwiching of the washer 5 (FIG. 4).

As FIGS. 1 to 5 show, the flange 12 accompanies the lip 6 beyond the end 4' of the radial flange 4 and can even participate in or support the precurving of the region 8 at the level of its transition with the part 5' of the washer 5, without, however, being made integral with this lip 6.

Figure 6:
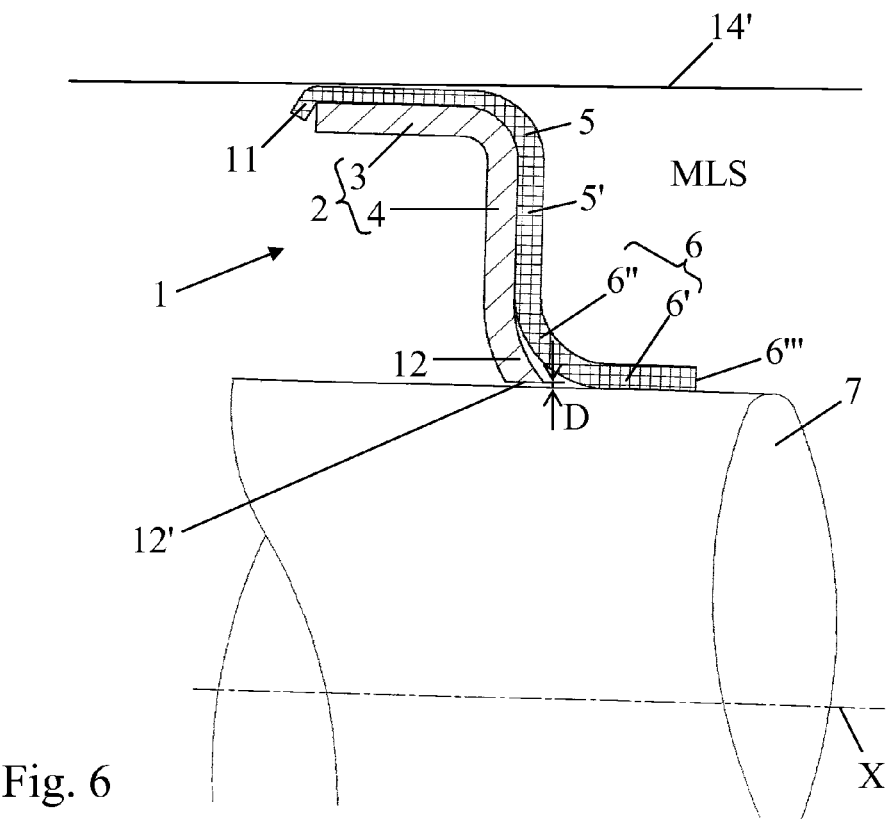
FIGS. 6 to 8 are partial cutaway views of a sealing joint in the mounted state, according to three design variants of a second embodiment of the invention.
Figure 7:
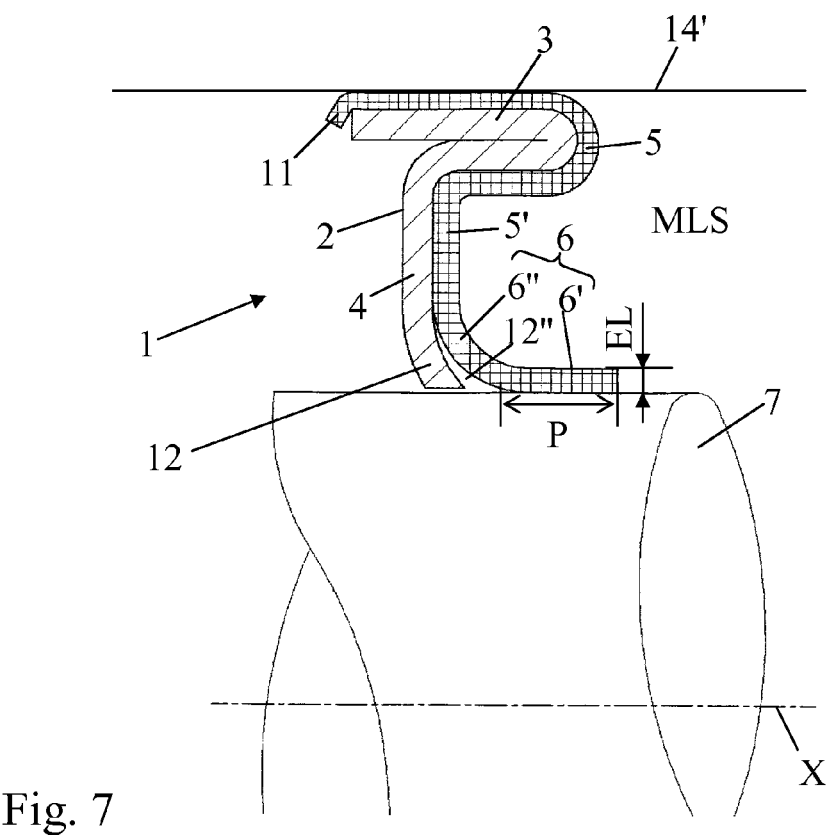
Figure 8:
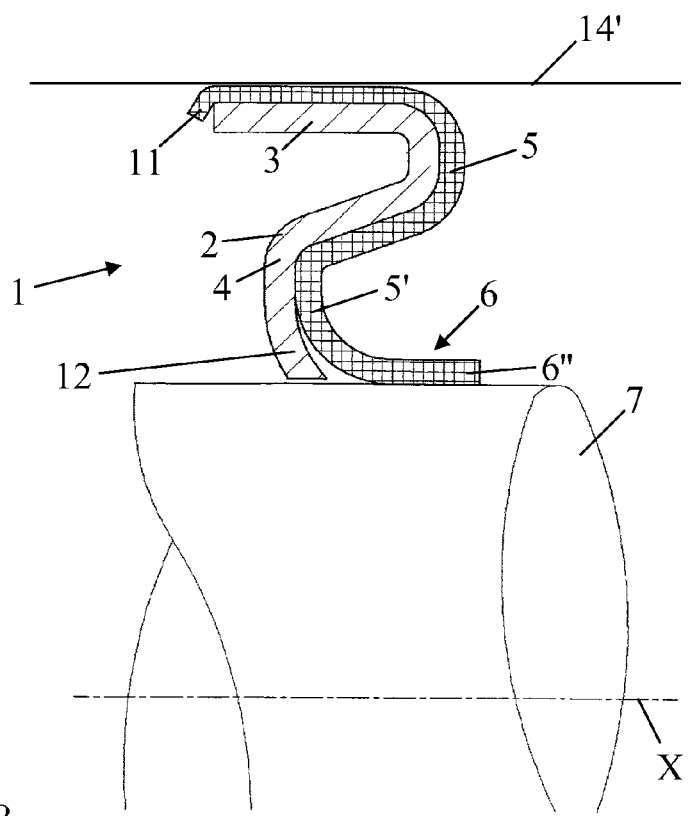

In accordance with a second embodiment of the invention, of which several variants are illustrated in FIGS. 6 to 8, the structure 12 for support and reinforcement is an integral part of the support ring 2 and consists of a portion of curved flange extending the radial flange 4 on the inside.

The result is thus a simple joint construction 1, not requiring an additional component, while providing the above-mentioned advantages.

The support ring 2 can have different shapes. In particular, the same basic shape can be broken down into several variants according to the dimensions of the housing 14, the desired rigidity, the available space requirement, or the local configuration (FIGS. 6 to 8).

According to a practical variant embodiment, suitable in particular for applications in relation to chemically aggressive liquids, the shape of the ring 2 and the relative arrangement of the washer on this ring can be provided in such a way that said washer 5 covers all of the surfaces of the support ring 2 that are directed, on the one hand, toward the pressurized medium MLS, and, on the other hand, toward the wall 14' of the mounting housing 14 of the sealing joint 1, against which the axial flange 3 of the support ring 2 comes to rest in an airtight manner.

Finally, for the purpose of ensuring the behavior of the mounting of the joint 1 in the housing 14, even in the case of significant thermal variations, the invention can provide that the support ring 2 and, if necessary, the second ring 13, is (are) made of an HLE-type plate, as specified in the PCT and French patent applications of the applicant.

Of course, the invention is not limited to the embodiments described and shown in the accompanying drawings. Modifications are possible, in particular from the standpoint of the composition of the various elements or by substitution of equivalent techniques, without thereby exceeding the scope of protection of the invention.

The invention claimed is:

1. A sealing joint for pressurized liquid, the sealing joint comprising:
   a support ring or frame with an external axial flange and an internal radial flange; and
   a washer made of a Teflon-based sealing material, which is mounted or arranged on said ring, by at least partially covering the external surface of the axial flange and by extending beyond the inner end of the radial flange to form a flexible sealing lip, configured to be applied circumferentially against or on an element that is to be sealed, the element to be sealed being a rotational cylindrical element, the sealing lip having an annular portion that at least partially rests on the element that is to be sealed and an annular curved connecting portion, the sealing lip having a thickness of less than 0.8 mm, and forming, in the absence of stress, essentially a sleeve or tapered ring with a peak angle of 90°−α, with α being between 10° and 50°.

2. The sealing joint according to claim 1, wherein the sealing lip, in the form of a tapered sleeve with an essentially flat wall in the absence of stress, is connected to the part of the washer that rests on and/or is made integral with the radial flange, by a precurved or inflected annular region of the washer, located immediately after the inner end of said radial flange, oriented in the direction of the medium that is to be sealed and that is part of the annular connecting portion.

3. The sealing joint according to claim 2, wherein the thickness of the sealing lip is between 0.4 and 0.7 mm, and
   wherein the angle α is between 15° and 45°, the precurved region being shaped by local deformation of the wall of the washer, before or after mounting on the support ring.

4. The sealing joint according to claim 1, wherein the thickness of the sealing lip is between 0.4 and 0.7 mm, and
   wherein the angle α is between 15° and 45°, the precurved region being shaped by local deformation of the wall of the washer, before or after mounting on the support ring.

5. The sealing joint according to claim 4, wherein the thickness of the sealing lip is between 0.45 and 0.65 mm, and the angle α is between 20° and 40°.

6. The sealing joint according to claim 1, wherein the relative dimensions and arrangements of the support ring, the washer made of a Teflon-based material, and the element that is to be sealed define an area for tight contact and support of the portion of the sealing lip on said element with an axial distance of between 1.5 and 5.0 mm from the free edge of said lip.

7. The sealing joint according to claim 1, wherein the sealing lip comprises, at the level of the contact surface of the portion of the lip configured to come to rest on the element that is to be sealed, a delivery structure that is helical or in the form of threading, in the form of a groove with opposite sides of inclinations or different slopes, with a cross-section or profile that is asymmetrically triangular in shape.

8. The sealing joint according to claim 6, wherein the axial distance is between 2.5 and 3.5 mm from the free edge of said lip.

9. The sealing joint according to claim 1, wherein the sealing washer extends beyond the free edge of the axial flange and forms a projecting part, inclined or curved toward the interior and covering at least the outside ridge of said free edge.

10. The sealing joint according to claim 1, further comprising an annular structure for support and reinforcement for the sealing lip that is located on the side opposite to the medium that is to be sealed and extending at the level of the curved annular portion of said lip, by partially assuming the shape of the annular portion and by being separated from the annular portion.

11. The sealing joint according to claim 10, wherein the annular structure for support and reinforcement includes a curved circumferential flange, the curving radius of said flange being greater than the curving radius, in the absence of pressure, of the annular connecting portion of the sealing lips after installation of the sealing joint around the element that is to be sealed, the curving radius of the flange being greater than the curving radius of the precurved annular region of the washer, in the absence of stress on the sealing lip.

12. The sealing joint according to claim 11, wherein the annular structure for support and reinforcement, in the form of a circumferential flange, extends up to a short distance from the element that is to be sealed, the free edge of the flange being located at a distance from said element that is less than the thickness of the sealing lip.

13. The sealing joint according to claim 11, wherein the structure for support and reinforcement is part of a second ring that comprises at least one radial flange that is extended from the inner side by a portion of a curved annular flange forming said structure.

14. The sealing joint according to claim 11, wherein the structure for support and reinforcement is an integral part of the support ring and includes a portion of curved flange extending the radial flange on the inside.

15. The sealing joint according to claim 10, wherein the annular structure for support and reinforcement, in the form of a circumferential flange, extends up to a short distance from the element that is to be sealed, the free edge of the flange being located at a distance from said element that is less than the thickness of the sealing lip.

16. The sealing joint according to claim 10, wherein the structure for support and reinforcement is part of a second ring that comprises at least one radial flange that is extended from the inner side by a portion of a curved annular flange forming said structure.

17. The sealing joint according to claim 16, wherein at least the part of the washer arranged on the radial flange of the support ring is sandwiched between the radial flange of the support ring and the radial flange of the second ring, optionally ensuring mechanical clamping of said washer part.

18. Sealing joint according to claim 16, wherein one or more of the support ring and the second ring are made of an HLE-type plate.

19. The sealing joint according to claim 10, wherein the structure for support and reinforcement is an integral part of the support ring and includes a portion of curved flange extending the radial flange on the inside.

20. The sealing joint according to claim 1, wherein the washer covers all of the surfaces of the support ring that are directed toward the pressurized medium and toward a wall of a mounting housing of the sealing joint, against which the axial flange of the support ring comes to rest in an airtight manner.

* * * * *